United States Patent [19]

Clark et al.

[11] Patent Number: 4,687,657
[45] Date of Patent: Aug. 18, 1987

[54] FABRICATION OF SIC - ALN ALLOYS

[75] Inventors: Terence J. Clark; Robert E. Johnson, both of Summit, N.J.

[73] Assignee: Celanese Corporation, New York, N.Y.

[21] Appl. No.: 872,312

[22] Filed: Jun. 9, 1986

[51] Int. Cl.$^4$ ............................................. C04B 35/64
[52] U.S. Cl. ..................................... 423/412; 423/345; 501/89; 501/98
[58] Field of Search ................... 423/412, 345; 501/89, 501/98

[56] References Cited

U.S. PATENT DOCUMENTS

| | | | |
|---|---|---|---|
| 2,744,074 | 5/1956 | Theobald | 260/2 |
| 3,505,246 | 4/1970 | Ehrlich et al. | 260/2 |
| 3,649,310 | 3/1972 | Yates | 423/345 |
| 3,875,133 | 4/1975 | Balducci et al. | 260/94.3 |
| 4,010,233 | 3/1977 | Winter et al. | 264/63 |
| 4,022,809 | 5/1977 | Cucinella et al. | 260/448 R |
| 4,032,553 | 6/1977 | Dozzi et al. | 260/448 R |
| 4,064,153 | 12/1977 | Cucinella et al. | 260/448 R |
| 4,097,294 | 6/1978 | Rice et al. | 106/43 |
| 4,105,455 | 8/1978 | Koga et al. | 106/44 |
| 4,128,567 | 12/1978 | Corbellini et al. | 260/448 R |
| 4,172,108 | 10/1979 | Maeda | 264/65 |
| 4,248,814 | 2/1981 | Yajima et al. | 264/63 |
| 4,284,932 | 8/1981 | Nishida et al. | 501/98 |
| 4,298,559 | 11/1981 | Bauey et al. | 423/345 |
| 4,310,481 | 1/1982 | Bauey | 423/345 |
| 4,414,403 | 11/1983 | Schilling, Jr. et al. | 423/345 |
| 4,514,555 | 4/1985 | Taniguchi et al. | 528/9 |
| 4,533,645 | 8/1985 | Huseby et al. | 423/412 |
| 4,533,712 | 8/1985 | Taniguchi et al. | 528/9 |
| 4,546,163 | 10/1985 | Haluska | 423/345 |
| 4,569,922 | 2/1986 | Suzuki | 501/89 |
| 4,581,468 | 4/1986 | Paciorek et al. | 556/403 |

FOREIGN PATENT DOCUMENTS 27653  2/1985  Japan ...................... 501/89

Primary Examiner—William R. Dixon, Jr.
Assistant Examiner—Ellen M. McAvoy
Attorney, Agent, or Firm—Depaoli & O'Brien

[57] ABSTRACT

An aluminum nitride ceramic is formed by pyrolyzing a poly-N-alkyliminoalane. A ceramic comprising a solid solution of silicon carbide and aluminum nitride is also formed by mixing a preceramic organosilicon polymer with a polyalkyliminoalane and pyrolyzing the mixed polymers composition to ceramic form.

18 Claims, No Drawings

FABRICATION OF SIC - ALN ALLOYS

FIELD OF THE INVENTION

This invention relates to a process for the production of ceramic materials from preceramic organometallic polymers and, articles formed therefrom. More particularly, the present invention is concerned with a process for the production of aluminum nitride ceramic articles from preceramic organoaluminum polymers. Additionally, the invention is concerned with forming a ceramic article comprising an alloy of silicon carbide and aluminum nitride from preceramic organosilicon and organoaluminum polymers.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

Ceramics made from organosilicon polymers have the potential to overcome these problems. To this end, polymers based on silicon, carbon and/or nitrogen and oxygen have been developed. See, for example, "Siloxanes, Silanes and Silazanes in the Preparation of Ceramics and Glasses" by Wills et al, and "Special Heat-Resisting Materials from Organometallic Polymers" by Yajima, in Ceramic Bulletin, Vol. 62, No. 8, pp. 893–915 (1983), and the references cited therein.

The major and most critical application for ceramics based on polymer processing is high strength, high modulus, reinforcing fibers. Such fibers are spun from organosilicon preceramic polymers and are subsequently converted to ceramic materials, in particular, silicon carbide/silicon nitride bearing fibers by a two-step process of curing to render the preceramic polymeric fibers insoluble followed by pyrolyzation comprising heating the fiber in an inert atmosphere up to about 2,000° C. whereupon the fibers are converted to ceramic form.

U.S. Pat. No. 3,853,567 is an early example of thermally treating a polysilazane resin to form ceramic articles comprising silicon carbide and/or silicon nitride. Thus, in Example 1 of the patent, a carbosilazane resin is formed, spun into filaments, the filaments rendered infusible by treating them with moist air for 20 hours at 110° C. and subsequently heated over the course of 7 hours to 1,200° C. in a nitrogen atmosphere and then to 1,500° C. over the course of 5 minutes. A black-glistening filament which is completely insensitive to oxidation at 1,200° C. and is amorphous to X-rays is disclosed as obtained. Subsequent heating to 1,800° C. under argon produced a fiber consisting of β-SiC, a little α-SiC and β-SiC$_3$N$_4$.

While silicon carbide- and silicon nitride-based ceramics have potential use in high-temperature applications as substitutes for metal super-alloys, it has recently been found that an alloy of SiC and AlN in comparison with SiC possesses superior creep resistance, improved fracture toughness, lower thermal conductivity, and possibly enhanced oxidation and corrosion resistance. Thus, Rafaniello et al have reported that by using AlCl$_3$.6H$_2$O, starch and SiO$_2$ fine powder as starting materials, and heating, a sintered powder comprising a SiC-AlN solid solution having improved properties relative to SiC was prepared (Journal of Materials Science 16 (1981) 3479–3488). Shaped articles were prepared by hot pressing the powder.

Sintered ceramic articles prepared by hot pressing ceramic powders are restricted to simple configurations and are incapable of being formed into more complex shapes. Accordingly, hot pressed ceramics are not yet totally satisfactory as useful engineering ceramics. Alternatively, a pressureless sintering method has been developed to form ceramic articles based on SiC, in general, as well as from SiC-AlN solid solutions. In the pressureless sintering method, a suitable sintering aid is incorporated, whereby a green body of silicon carbide powder is sintered in an atmosphere under atmospheric pressure or under pressure in the vicinity of atmospheric pressure. By this method, it is possible to obtain a highly dense high strength sintered article having any desired shape. However, the strength, particularly the high temperature strength of ceramics formed by this pressureless sintering method is still inadequate and has processing drawbacks. A good summary of the current art of forming silicon carbide, silicon carbide/silicon nitride, and silicon carbide/aluminum nitride articles from inorganic powder is set forth in U.S. Pat. No. 4,569,922 which is herein incorporated.

While processes of forming ceramic articles from inorganic powders has been found incapable of satisfactorily producing ceramic articles of complex shapes, the formation of ceramic articles from preceramic organometallic polymers is starting to overcome the processing difficulties found using inorganic starting materials. Not only have silicon carbide and silicon nitride articles, including fibers, been formed from preceramic organosilicon polymers as discussed above, alumina fibers have been formed from organoaluminum compounds including organoaluminum polymers. Thus, U.S. Pat. Nos. 4,514,555 and 4,533,712 disclose processes of producing high molecular weight organoaluminum polymers comprising reacting water and an organoaluminum compound represented by the formula:

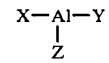

wherein X, Y and Z are each a hydrogen atom, an alkyl group, and alkoxyl group, or an acyloxyl group and an organic acid. The polymers can be spun into fibers and then heated to produce alumina fibers.

Ceramic articles from organometallic polymers are further disclosed in U.S. Pat. No. 4,097,294. This patent discloses selecting one or a mixture of polymers selected from the class consisting of poly(diorganosilanes), poly(haloorganosilanes), poly(carbosilanes), polysilazanes, polycarbocarboranes and polyborazines and heating the polymers to produce the ceramic. This patent also discloses a mixed ternary ceramic obtained from a polymer containing repeating units of a framework comprising carbon, boron, silicon and siloxane components.

U.S. Pat. No. 4,105,455 discloses a method of producing a sintered silicon carbide body by the steps of forming a polycarbosilane which is insoluble in solvents and unmeltable, pulverizing the insoluble and unmeltable carbosilane so as to form a powder and applying heat with or without the use of pressure to the powder to decompose the powder into silicon carbide. In Example 8 of this patent there is disclosed a process of forming a polycarbosilane soluble in n-hexane, mixing therewith aluminum-iso-propoxide and heating to obtain an insoluble and unmeltable polycarbosilane containing a small amount of aluminum. The mixture is pulverized and charged into a graphite mold to form a ceramic. The patent teaches adding other organometallic compounds including alkylborates and the like to the soluble polycarbosilane, heating to form an insoluble polymer and pulverizing the powder.

U.S. Pat. No. 4,172,108 discloses a process for producing sialons, i.e. solid solutions of silicon nitride and alumina. The process comprises mixing a silicon nitride precursor such as amino-or imino-silanes and an alumina precursor such as trialkoxy- or triacyloxy-aluminums or polyaluminoxanes to obtain a sialon precursor, and then heating the sialon precursor to form the ceramic.

U.S. Pat. No. 4,248,814 discloses a process for producing a heat-resistant ceramic sintered body which comprises mixing a polycarbosilane with a polyborosiloxane containing phenyl groups in at least part of the side chains of Si, heating the polymer mixture to form a polycarbosilane partly containing siloxane bonds, mixing the polycarbosilane with a ceramic powder such as metallic oxides, carbides, nitrides, borides and silicides, shaping the resulting mixture and sintering the mixture to form a ceramic.

There is still a need, therefore, to form ceramics comprising an alloy of SiC and AlN by a method which will allow fabrication of complex shapes and still retain the desired mechanical properties of ceramic materials. Up until the present time, the art has not suggested a method of forming aluminum nitride and SiC and AlN solid solutions from other than inorganic powders which have not yet been formed into satisfactory high performance ceramic articles.

SUMMARY OF THE INVENTION

It is therefore an object of this invention to provide an efficient method of producing aluminum nitride ceramics.

Another object of this invention is to provide a method of improving the mechanical properties of silicon carbide ceramic articles.

Another object of this invention is to provide a method of producing SiC and AlN ceramic alloys from preceramic organic polymers.

These and other objects of this invention are achieved by a method which comprises pyrolyzing a poly-N-alkyliminoalane containing repeated units represented by the formula

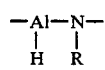

in which is R is an aliphatic, cycloaliphatic or aromatic radical.

In another aspect of the present invention, a ceramic alloy of silicon carbide and aluminum nitride is produced by mixing a solution of a polycarbosilane with a solution of poly(N-alkyiminoalane), removing the solvent from the mixture of polymers and heating the solid polymeric mixture to effect the conversion of the polymers to a ceramic product containing an alloy of SiC and AlN.

DETAILED DESCRIPTION OF THE INVENTION

Organosilicon preceramic polymers are well known in the art. Such polymers contain silicon, carbon and/or nitrogen, and oxygen, are fiber-forming, and can be cured and pyrolyzed to ceramic form. See, for example, U.S. Pat. Nos. 4,310,651; 4,312,970; 4,342,712; 4,482,689; and 4,340,619, which are incorporated herein by reference. Such polymers optionally may be modified with chemical groups to allow subsequent curing in the absence of oxygen. See, for example, U.S. Pat. No. Re. 31,947, which is incorporated herein by reference.

The organosilicon preceramic polymers which can be converted to a silicon carbide ceramic may be made in a variety of ways as is known in the art. For example, a silicon carbide ceramic is obtainable from one or a mixture of the following polymers: (1) a poly(diorganosilane) of the general formula: $(R_2Si)_x$; (2) a poly(haloorganosilane) of the general formula: $(RXSi)_x$; and (3) a poly(carbosilane) of the general formula: $(R_2SiCR_2)_x$; wherein x is greater than 4, R is an alkane, alkene, alkyne, aryl, or alkylaryl group having from 1 to 10 carbon atoms or a halogenated derivative thereof, X is a halogen, and n is an integer from 1 to 10.

Optionally, the organosilicon preceramic polymers utilized in the present invention may consist essentially of silicon, carbon as well as nitrogen and oxygen. Such polymers are typically prepared by reacting a disilazane and a dichlorodisilane or a methylchlorodisilane.

Additionally, the silicon carbide forming organosilicon preceramic polymers of the present invention may be mixed with polysilazanes prepared from methylchlorodisilanes and hexamethyldisilazane. Similarly, polysilazanes, containing N-Si-Si-N linkages may be added. Optionally, the addition of difunctional monosilanes as co-reactants may be used to enhance spinning and/or subsequent fiber handling properties. Such difunctional monosilanes include preferably $R_1R_2SiCl_2$, where $R_1$ and $R_2$ may independently be an ethyl, phenyl or vinyl group. The organosilicon preceramic polymers may be further modified, for example, by incorporating vinyl functionality by reacting with the polymer itself. This may be achieved, for example, by co-reacting the polymer with a vinyl (Vi) halosilane such as $ViR_1R_2SiCl$, where $R_1$ and $R_2$ may each independently be methyl or phenyl.

Molecular weight ($M_n$) for the above organosilicon preceramic polymers may vary from about 500 to 20,000 preferably about 700 to 5,000, and most preferably 1,000 to 2,000 (g/mole-GPC method). These polymers may also have softening temperatures ($T_s$) of about 50° C. to 308° C., preferably about 60° C. to 200° C., and most preferably 70° C. to 150° C.

The preceramic organoaluminum compounds which are used to produce aluminum nitride are organoaluminum polymers containing a backbone comprised of alternating aluminum- and nitrogen-containing groups.

Useful in the present invention are the poly-N-alkyliminoalanes which have a backbone of repeating aluminum and nitrogen atoms. Poly-N-alkyliminoalanes are known in the art and have been previously utilized as co-catalysts in the synthesis of polyethylene and highly stereospecific olefinic and diolefinic polymers.

The reaction between ether-dioxane solutions of AlH₃ and methylamine has been reported by Wiberg and May in "A. Naturforsch, 10 b 232 (1955)". According to these authors there is obtained an insoluble substance to which has been assigned a polymeric structure corresponding to a poly (N-methyl-iminoalane) containing repeated unities of the type-HAl-NCH₃-.

Ehrlich and May, in U.S. Pat. No. 3,505,246, reported the preparation of similar compounds, which they named poly(N-ethylalazenes) and poly(N-methylalazenes) and defined as long chain-polymeric compounds, having a polymerization degree of (HAl-NR) unities of at least 10.

More recently, U.S. Pat. Nos. 4,022,809; 4,032,553; 4,064,153; and 4,128,567 all disclose processes of making poly-N-alkyliminoalanes and these references are herein incorporated by reference.

In accordance with the latter-mentioned patents, a poly-N-alkyliminoalane containing repeated units represented by the formula:

in which R is an aliphatic, cycloaliphatic or aromatic radical can be formed by reacting an alanate of an alkali or alkali-earth metal with a primary amine in the presence of a solvent selected from the aliphatic, cycloaliphatic and aromatic hydrocarbons. Any alkali or alkali-earth metal may be employed although preferred alanates include LiAlH₄, NaAlH, Li₃AlH₆, and Na₃AlH₆. The amine can be selected from the primary aliphatic, cycloaliphatic or aromatic amines. Reaction temperatures can range from −20° plus 250° C., preferably at a temperature ranging from room temperature to 250° C. Reaction pressure is not very important and thus operating about atmospheric pressure is preferred.

Another poly-N-alkyliminoalane which is useful in the present invention is made up of a plurality of 4 and/or 6 member rings of the formula:

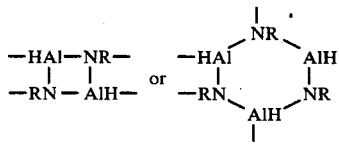

wherein R is an aliphatic, cycloaliphatic or aromatic hydrocarbon combined in a tridimensional cage structure having the chemical composition (HAl-NR)ₙ, in which R has the above meaning and n is a whole number lower than or equal to 10. These polymers are prepared by reacting a primary amine containing a secondary or tertiary carbon atom in alpha or beta position with respect to the amine nitrogen atom or amide derivative thereof wherein the amine radical contains a secondary or tertiary carbon atom in alpha or beta position with respect to the nitrogen atom with a complex formed by AlH₃ and a Lewis base, or by reacting the primary amine with an alkali or alkaline-earth metal alanate. The examples of amines employable in the preparation of these products are isopropylamine, sec-butylamine, isobutylamine, tert-butylamine, and cyclobutylamine.

The molecular weight for the above organoaluminum preceramic polymers may vary from about 200 to 10,000 but, more preferably will fall within the range from about 200 to about 1,000, with molecular weights of about 250 to 600 being typical.

The poly(N-alkyliminoalane) is converted to an aluminum nitride ceramic by heating the solid polymer to temperatures above 1,000° C. in an inert atmosphere such as argon, or in a vacuum.

To form ceramic articles containing an alloy of SiC and AlN, a solution of the polycarbosilane is homogenously mixed with a solution of the poly(N-alkyliminoalane), the mixture stripped of solvent to yield a solid blend of the polymers, and the blend heated to effect conversion of the polymers to the ceramic product.

Any known solvent can be utilized to dissolve the preceramic organometallic polymers including aliphatic, cycloaliphatic and aromatic hydrocarbons, as well as oxygenated derivatives thereof. The choice of solvent is not critical, it only being required that the solvents for the respective organometallic polymers be compatible if they are different so as to form a homogenous mixture of the preceramic polymers.

The weight ratio of organosilicon polymer to organoaluminum polymer is also not critical and can vary widely from a weight ratio of 10:1 to 1:10. Preferably, the respective preceramic polymers are added in more equal amounts with the weight ratio of organosilicon to organoaluminum polymer being from about 2:1 to 1:2. Most preferably, about a 1:1 weight ratio of the respective polymers is desired to form a ceramic article which comprises mainly a solid solution of silicon carbide and aluminum nitride.

One particular advantageous use of the silicon carbide and aluminum nitride alloy formed by the process of the present invention is in the formation of high strength ceramic fibers. Inasmuch as the respective organometallic polymers are soluble in conventional solvents, the dry spinning process can be utilized to form preceramic polymeric fibers which can be pyrolyzed to ceramic form.

To dry spin, the solid organometallic polymers are dissolved in a suitable solvent or solvents at suitable polymer solids concentrations, homogenously mixed and spun on conventional dry spinning apparatus. Solvents with relatively low boiling points are preferred to permit the efficient extraction of solvent from the spun fibers without adversely affecting the mixed polymer composition. Particularly preferred solvents are toluene and xylene. Relatively high solids concentrations of the organometallic polymer composition in the spinning solution is important to achieve a self supporting threadline with these relatively low-molecular weight, highly branched organometallic polymers. Typical polymer solids concentrations of at least about 70 to about 80% are useful.

A compatible thermoplastic polymer which can be dissolved may be added to the spinning solution of organometallic preceramic polymers to improve spinning properties. Suitable polymers for blending can be selected generally from various types which improve the processability of the organometallic preceramic fiber. The polymers blended should be mutually compatible, physically, and chemically. Some compatible resins include vinyl polymers and copolymers, diolefin polymers, polyethers, polythioethers, polyesters, polyamides and polypeptides.

After spinning, the preceramic fibers are typically cured or cross-linked and thereafter pyrolyzed to ceramic form.

Effective curing conditions are defined as those curing conditions after which the organometallic preceramic fibers become infusible and the fibers may be pyrolyzed without melting or fusing together. A variety of curing methods may be used. These include oxidative and hydrolytic cures, reactive cures, thermal cures, and radiolytic cures. The presently preferred method of curing is via an oxidative/hydrolytic cure. Typically, this entails heating the fibers in a controlled humidity environment, where humidity can range from about 8 to 100%.

Curing may be carried out at temperatures from about 50°–400° C., the rate of curing increasing as the temperature increases.

The cured preceramic fibers are then pyrolyzed at about 1200° C. to convert the fibers to ceramic form containing a solid solution of SiC and AlN. Typical heating rates during pyrolyzation comprise about 3° C. per minute from room temperature up to about 1100°–1200° C. Pyrolyzation is typically carried out in an inert atmosphere such as nitrogen, argon, or in a vacuum.

EXAMPLE 1

An aluminum nitride ceramic is obtained from a poly-N-alkyliminoalane by the following procedure in which the poly-N-alkyliminoalane is formed by the procedure disclosed in U.S. Pat. No. 4,022,809.

For example, a solution of 15.7 ml of iso $C_3H_7$—$NH_2$ in 30 ml of anhydrous heptane is added, drop by drop, to a stirred suspension formed by 7.85 grams of commercial $LiAlH_4$ in 170 ml of anhydrous heptane, cooled at 0° C. The procedure is carried out under a nitrogen atmosphere. The reaction mixture is kept under stirring for some hours at the reflux temperature of the solvent.

During the reaction, a development of $H_2$ is observed. At the end of reaction, filtration is performed and the product in solution is separated from the solvent by evaporating under vacuum at room temperature and drying at room temperature for about 8 hours.

Expected product is about 14.5 grams of a crystalline white solid having the following chemical analysis:

Al%=30.52; N%=16.17; Li%=0.003; $H_{active}$=12.03 Meq/g.

Calculated for $(HAl-NR)_n$: Al%=31.70; N%=16.46; Li%=$H_{active}$=11.76 Meq/g.

The molecular weight such as determined in boiling diethyl ether, is 400 according to the formation of a mixture of poly-N-alkyliminoalanes wherein the values of n are 4 and 6 respectively.

The solid poly-N-alkyliminoalane polymer is converted to aluminum nitride by heating in argon from room temperature to a temperature of about 1200° C.

EXAMPLE 2

In this example is described a process for forming a ceramic alloy of silicon carbide and aluminum nitride.

The organoaluminum compound used is the poly-N-alkyliminoalane as prepared by the process set forth in Example 1.

The organosilicon polymer used to form silicon carbide is formed as set forth in U.S. Pat. No. 4,310,651. As disclosed therein, organohalogen disilanes are treated with 0.1 to 10% by weight of a catalyst selected from the group consisting of quaternary ammonium halides, quaternary phosphonium halides and hexamethylphosphoramide. Thus, a 250 ml 3-neck glass flask equipped with a nitrogen inlet tube, thermometer and condenser affixed to a toluene bubble trap is used to form the polycarbosilane. A vacuum is drawn on the flask and the flask is flushed with dry nitrogen. Nitrogen flow is continued after 0.5 grams of tetrabutylphosphonium chloride is added to the flask and heated to melting. As the starting material is used, Direct Process Residue (DPR) which is the disilane, $CH_3Cl_2SiSi(CH_3)_2Cl$ found in large quantities in the residue from the reaction of synthesizing organochlorosilane. In such reaction, gaseous organic chloride is passed over heated silicon and a catalyst. 400 grams DPR is slowly added over 3 hours to the flask after an initial addition of 30–50 ml. The reaction is continued for another 5 hours. After eight hours of collecting distillate at less than 80° C., head temperature heating is stopped. Upon cooling, a viscous yellow fluid remains in the flask that cools to a yellow wax-like solid. The material is soluble in toluene.

The poly-N-alkyliminoalane is dissolved in toluene at a concentration of approximately 50 wt. % solids and is mixed with the polycarbosilane dissolved in toluene at a concentration of about 50 wt. %. The weight ratio of poly-N-alkyliminoalane to organosilicon polymer is 1:1. The solvent is removed by evaporating under vacuum at room temperature and drying the mixed polymer at room temperature for about 8 hours.

The solid polymer composition which remains is heated to 1200° C. from room temperature at a heating rate of approximately 3° C. per minute. A ceramic product containing a solid solution of silicon carbide and aluminum nitride is expected.

What is claimed is:

1. A process for forming an aluminum nitride ceramic comprising; pyrolyzing an organoaluminum preceramic polymer containing a backbone comprised of alternating aluminum- and nitrogen-containing groups at a temperature above 1,000° C. in an inert atmosphere.

2. The process of claim 1 wherein said organoaluminum polymer is a poly-N-alkyliminoalane containing repeating units represented by the formula:

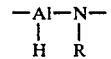

in which R is an aliphatic, cycloaliphatic or aromatic radical.

3. The process of claim 1 wherein said organoaluminum compound is a poly-N-alkyliminoalane made up of a plurality of 4 and/or 6 member rings of the formula:

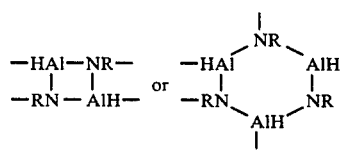

wherein R is an aliphatic, cycloaliphatic or aromatic hydrocarbon combined in a tridimensional cage structure having the chemical composition (HAl-NR)$_N$, in which R has the above meaning and n is a whole number lower than or equal to 10.

4. A ceramic article produced by the process of claim 2.

5. A ceramic article produced by the process of claim 3.

6. A process of forming a silicon carbide and aluminum nitride solid solution comprising mixing a preceramic organosilicon polymer capable of being pyrolyzed to silicon carbide and a preceramic organoaluminum polymer capable of being pyrolyzed to aluminum nitride, and pyrolyzing the mixed polymer composition at a temperature about 1,000° C. in an inert atmosphere to convert the respective organometallic polymers to ceramic form.

7. The process of claim 6 wherein said organosilicon preceramic polymer is selected the group consisting of poly(diorganosilanes), poly(haloorganosilanes) and poly(carbosilanes).

8. The process of claim 6 wherein said organoaluminum polymer comprises a backbone of repeating aluminum- and nitrogen-containing groups.

9. The process of claim 8 wherein said organoaluminum polymer is a poly-N-alkyliminoalane containing repeating units represented by the formula:

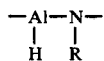

in which R is an aliphatic, cycloaliphatic or aromatic radical.

10. The process of claim 8 wherein said organoaluminum compound is a poly-N-alkyliminoalane made up of a plurality of 4 and/or 6 member rings of the formula:

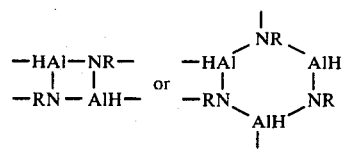

wherein R is an aliphatic, cycloaliphatic or aromatic hydrocarbon combined in a tridimensional cage structure having the chemical composition (HAl-NR)$_n$, in which R has the above meaning and n is a whole number lower than or equal to 10.

11. The process of claim 8 wherein said polymer mixture is formed by mixing the respective organometallic polymers in a solvent, mixing the solvated polymers and drying off the solvent.

12. The process of claim 11 wherein the solvated polymers are spun into fibers comprising a mixture of the organometallic polymers and pyrolyzed to form ceramic fibers.

13. A ceramic article formed by the process of claim 9.

14. A ceramic article formed by the process of claim 10.

15. A ceramic fiber formed by the process of claim 12.

16. A preceramic composition comprising a mixture of a preceramic organosilicon polymer and a preceramic organoaluminum polymer capable of being pyrolyzed to aluminum nitride.

17. A preceramic article shaped from the composition of claim 16.

18. The preceramic article of claim 17 wherein said composition is shaped by spinning said preceramic composition into a preceramic fiber.

* * * * *